F. D. CLAPPER.
ENVELOP.
APPLICATION FILED DEC. 30, 1915.
1,280,663.  Patented Oct. 8, 1918.
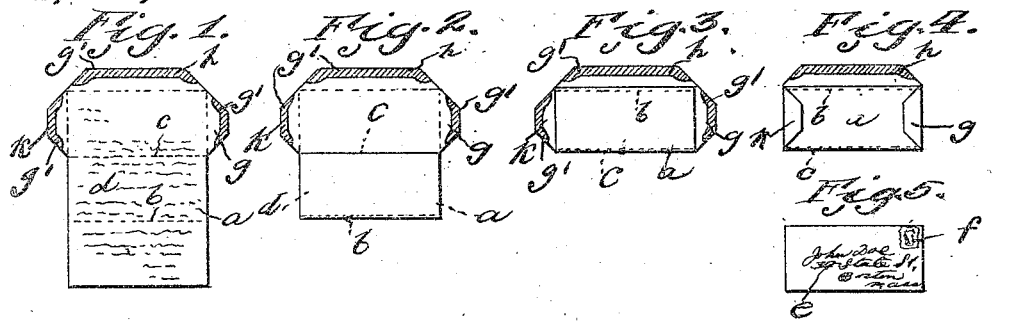
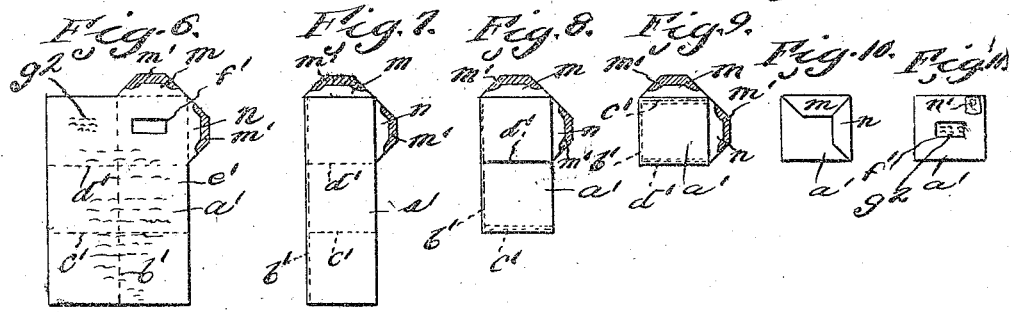
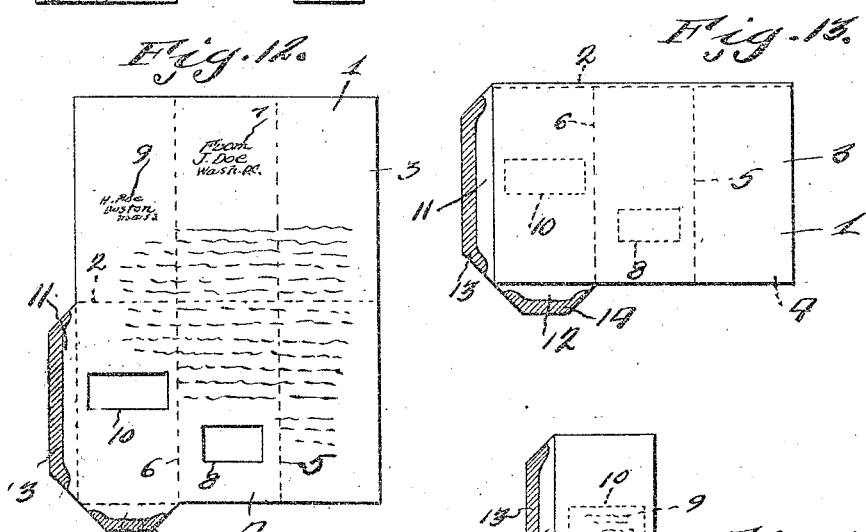
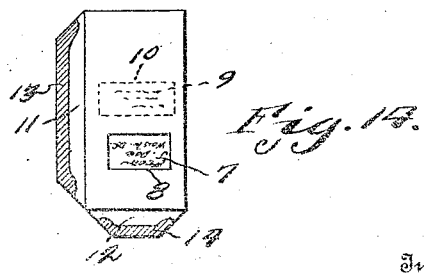
Inventor
F. D. Clapper
Witnesses

UNITED STATES PATENT OFFICE.

FRANK D. CLAPPER, OF ALTUS, OKLAHOMA.

ENVELOP.

1,280,663.  Specification of Letters Patent.  Patented Oct. 8, 1918.

Application filed December 30, 1915. Serial No. 69,397.

*To all whom it may concern:*

Be it known that I, FRANK D. CLAPPER, a citizen of the United States, residing at Altus, in the county of Jackson, State of Oklahoma, have invented a new and useful Envelop; and I do hereby declare the following to be a full, clear, and exact description of the invention, such as will enable others skilled in the art to which it appertains to make and use the same.

This invention relates to an improved combined writing sheet and envelop, and an object of the invention is to provide a simple and efficient and practical article of manufacture, of this character, in which improved features of construction exist.

Another object of the invention is to provide a combined letter head sheet and envelop, which sheet is so scored for folding, as to provide an envelop, which, owing to the printed letter head part of the sheet and the typewritten name of the addressee, is self-addressed, and provided with the usual return mark.

One of the features of the invention is the provision of a sheet of this character having a pair of openings, so that when the sheet is folded to form an envelop, the name of the addressee will appear through one of the openings, whereas the letter head mark or the name of the sender will appear through the other opening, thereby affording an envelop self-addressed and having self-marked return indications.

In practical fields the details of construction may necessitate alterations, falling within the scope of what is claimed.

The invention comprises further features and combination of parts, as hereinafter set forth, shown in the drawings and claimed.

In the drawings:—

Figure 1 is a plan view of a combined writing sheet and envelop, showing the sheet opened.

Fig. 2 is a plan view of the sheet, showing the same partly folded.

Fig. 3 is a plan view showing the sheet completely folded and the adhesive flaps unsealed.

Fig. 4 is a plan view of the sheet completely folded with two of the flaps sealed, and one unsealed.

Fig. 5 is a plan view showing the sheet completely folded and entirely sealed, and inverted and illustrating the addressee.

Fig. 6 is a plan view of a combined writing sheet and envelop showing the same open and provided with scored lines, whereby the sheet may be folded three times instead of two, and so that the name of the addressee can be seen through an opening in the sheet.

Fig. 7 is a plan view of the sheet shown in Fig. 6, showing the first fold.

Fig. 8 is a plan view of the sheet showing the second fold.

Fig. 9 is a plan view of the sheet shown in Figs. 6, 7 and 8, showing the third fold.

Fig. 10 is a plan view of the sheet illustrated in Figs. 6 to 9 inclusive showing it completely folded and sealed.

Fig. 11 is a plan view of the sheet showing the same folded to form the envelop, which is self-addressed, owing to the addressee's name appearing through the opening in the sheet.

Fig. 12 is a plan view of a combined letter head and writing sheet, so scored and provided with openings, that when the sheet is folded in the form of an envelop, it is self-addressed and provided with the return mark, owing to the addressee's name and the letter head of the sender appearing through the two openings.

Fig. 13 is a plan view of the sheet in Fig. 12, showing the first fold.

Fig. 14 is a plan view of the sheet, in Figs. 12 and 13, showing three folds, in which case the sender's or letter head mark appears through one opening in one side of the envelop, while the addressee's name appears upon the others side of the envelop.

Referring to Figs. 1 to 5 inclusive $a$ designates the writing sheet, which is scored at $b$ and $c$, so that the sheet may be folded twice, so as to form a complete envelop as in Fig. 5, and upon the inner face $d$ of this sheet, the body of the letter may be written, and after the sheet is folded, the addressee's name $e$ and stamp $f$ may be applied as in Fig. 5. After the sheet has been folded upon the scored lines $b$ and $c$, as shown in Figs. 2, 3 and 4, the flaps $g$, $h$ and $k$ (which are provided with adhesive material $g'$) may be sealed, as in Figs. 4 and 5.

Referring to Figs. 6 to 11 inclusive $a'$ denotes a writing sheet, which is scored at $b'$, $c'$ and $d'$, so that the sheet may be folded three times instead of twice, so as to provide the envelop. The body of a letter may be written upon the inner face $e'$. This sheet $a'$ is provided with an opening $f'$, through which the addressee's name $g^2$ may appear, when the sheet $a'$ is folded to form the envelop, and after the sheet is folded, the flaps $m$ and $n$ (which are provided with adhesive material $m'$) may be sealed, as in Fig. 10, and when the envelop is inverted as in Fig. 11 (which envelop may be supplied with a stamp $n'$), the addressee's name may appear through the opening $f'$.

Referring more especially to Figs. 12 to 14 inclusive, 1 designates a letter head writing sheet being scored at 2, so as to fold substantially midway the ends of the sheet, to form the upper and lower halves 3 and 4. The sheet is additionally scored at 5 and 6, so that the sheet after being folded upon the scored line 2 may be folded a second and third time upon the lines or scores 5 and 6, as will be clearly understood from Figs. 12 to 14 inclusive. The sheet is provided with the usual letter head mark 7, and the lower half of the sheet has an opening 8, through which the letter head mark 7 appears, when the sheet is folded the three times. When writing a business letter the name and address of the addressee is usually typewritten near the upper left hand corner of the sheet, as shown at 9. The lower part of the sheet to the left of the opening 8 is provided with an opening 10 through which the name of the addressee appears, when the sheet is folded to form the envelop. The flaps 11 and 12 are provided with adhesive material 13 and 14, so that after the sheet is folded to form the envelop, the flaps 11 and 12 may be sealed. By this construction of combined letter head and writing sheet, an improved envelop is provided having the same self-addressed, and provided with self-returned indications, thereby eliminating the necessity of separately printing the return mark on the envelop, and separately addressing the same.

The invention having been set forth, what is claimed as new and useful is:

As a new article of manufacture, a combined letter head writing sheet and envelop constructed from a single paper blank, two contiguous edges of the blank at one corner being provided with integral flaps having adhesive material thereon, the center of the blank at the top diagonally opposite the flap being provided with a letter head marking, to one side of the letter head marking and diagonally below the same, said blank having the addressee's name, the center of said blank at its bottom directly below the letter head marking having an opening, said blank diagonally to the left side and above said opening having a second opening, said blank being scored in two places from the top to the bottom, and scored transversely substantially across the center of the sheet, whereby when the blank is folded on said scores and the flaps adhesively fastened to the back of the sheet or blank, the letter head marking and the addressee's name will appear through the first and second openings respectively, thereby providing a self addressed envelop having self returned indications.

In testimony whereof I have signed my name to this specification in the presence of two subscribing witnesses.

FRANK D. CLAPPER.

Witnesses:
S. E. HECKMAN,
S. L. WALLINGFORD.